Oct. 20, 1964   F. M. SAJOVEC, JR., ETAL   3,153,352
AUTOMATICALLY ACTUATED SPRING CLUTCHES
Filed Dec. 19, 1962

INVENTORS
FRANK M. SAJOVEC JR
DONALD R TOMKO
BY George M Soule
ATTORNEY

United States Patent Office 3,153,352
Patented Oct. 20, 1964

3,153,352
AUTOMATICALLY ACTUATED SPRING CLUTCHES
Frank M. Sajovec, Jr., Willowick, and Donald R. Tomko, Cleveland, Ohio, assignors to Curtiss-Wright Corporation, a corporation of Delaware
Filed Dec. 19, 1962, Ser. No. 245,750
5 Claims. (Cl. 74—722)

The present invention provides a simple and effectual unitary, automatically actuated transmission unit using a helical coil or spring clutch assembly capable of operation to enable driving of a load reversibly by one source of power at desired speeds and unidirectionally by another source of power at another or other higher speeds.

The invention further provides a self-actuated spring or coil clutch unit enabling safe use of two power sources continuously connected to the unit for selective operation of a common load under at least three desired conditions.

The invention further provides an improved simple helical spring clutch unit for enabling plural speed and plural direction driving of a load without requiring actuator controls for the necessary clutch springs.

One practical use of the present helical coil clutch or transmission unit is in the driving of domestic type laundry machines wherein it is desired to turn a single rotary load carrier (e.g. tub) cyclically by a reversible motor for washing and load balancing purposes and wherein it is desired to increase the load speed in one or more steps, as for centrifugal drying, through the use of a different motor coupled with the load, the present unit enabling changing from each operation to a succeeding one simply by programmed motor control via suitable switches or controllers.

Objects and features of the invention not indicated above will become apparent from the following description of an illustrative form. The essential characteristics are summarized in the claims.

Figure 1:
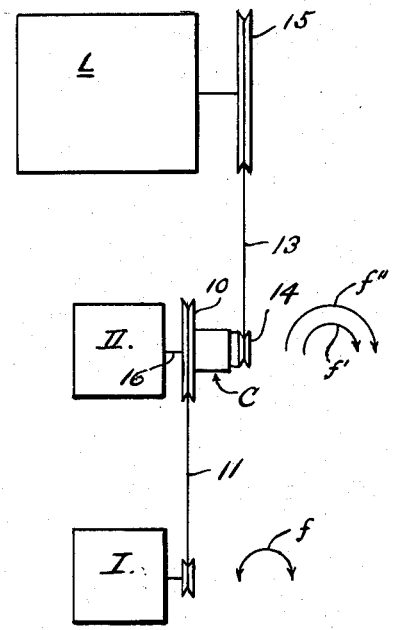

In the drawing FIG. 1 is a diagram showing an embodiment of the present clutch or transmission unit C in a preferred relationship to two driving motors and a common load.

Figure 2:
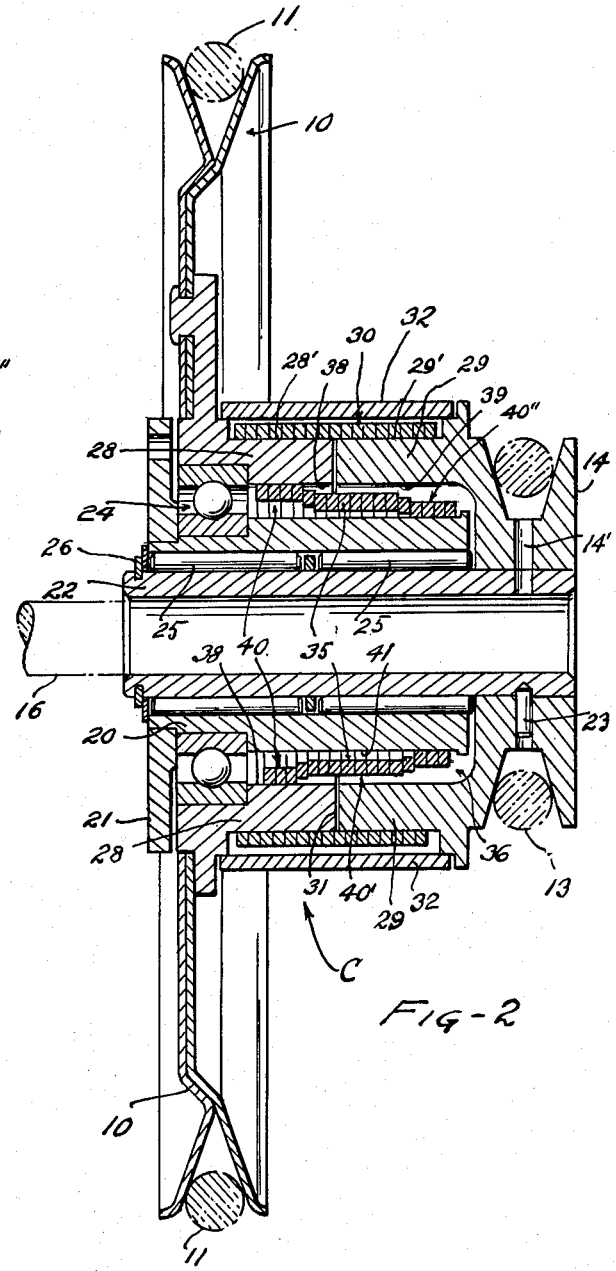

FIG. 2 is a relatively enlarged axial central sectional view through the clutch or transmission unit C.

The term "full floating" as used herein in reference to a helical clutch spring refers to the fact that coils of the spring are unattached to a cooperating clutch drum except by friction and "doubly full floating" means solely frictionally connected to each of two cooperating clutch drums.

In FIG. 1 electric motor I is shown connected to an input wheel 10 of the clutch C by a belt 11 for operation of the load L as through a second belt 13 between an output wheel 14 of the clutch unit and a cooperating pulley 15 connected with the load. For performance of the desired washing cycle and for draining the motor I has for example identical forward and reverse speeds as indicated by double arrow f adjacent motor I. Motor II has two forward speeds only as indicated by arrow f' and f'', the fast speed being for example double the operating speed of motor I and the slow speed of motor II.

The clutch unit C may be supported on the armature shaft or output shaft 16 of motor II which shaft is permanently and directly connected to the output wheel 14 of clutch unit C. Thus whenever motor I is in operation to drive the load L the motor II is deenergized and its output shaft is turned idly in whatever direction the motor I is then being operated for relatively low speed driving of the load.

In FIG. 2 the clutch or transmission unit C is shown as comprising, in part, a stationary sleeve 20 having an integral flange 21 for attachment to a suitable support or framework not shown. The flanged sleeve 20, 21, can thus support the rotating parts of the unit via suitable bearings to be described. Drive shaft 16 of motor II extends into an adapter sleeve 22 suitably secured as by a pin in hole 14' in the wheel 14 and sleeve 22. Adapter sleeve 22 is shown separately secured rigidly to the output wheel 14 of the clutch unit as by a pin 23.

The low speed wheel or pulley 10 is shown as supported on the stationary sleeve 20 as by an anti-friction bearing assembly 24 and the output wheel and sleeve unit 14, 22 can be suitably journalled on the stationary sleeve 20 via bearings 25, shown as rollers. All the parts mentioned above can be held in freely working position axially of the sleeve 22 by a snap ring 26 between the leftward end of the rotary sleeve 22 and the flange 21 of stationary sleeve 20.

Input wheel 10 of motor unit I has as shown a circular clutch drum portion or member 28 in axial alignment with a coacting drum portion or member 29 of the output wheel 14 and a doubly full floating (e.g., left hand wound) clutch spring 30 is preloaded for self-energization on the two drums at respective sides of the usual crossover gap 31 between the drums. Clutch spring 30 for centrifugal release purposes as will be described is more heavily preloaded via one or more of its rightward end coils on the drum 29 than any of the coils of the spring 30 are preloaded on the drum 28. The clutch drum surfaces gripped by the clutch spring 30 are indicated 28' and 29' respectively. Clutch spring 30 and the associated drum members transmit torque only in one direction and if the spring is left hand wound as mentioned the direction is counterclockwise as the clutch would be viewed from a point rightwardly of wheel 14 in FIGS. 1 and 2. A suitable protective casing sleeve 32 is freely turnably mounted in suitable coacting guideways on the wheel members 10 and 14. The sleeve 32 also limits expansion of the coils of spring 30 by centrifugal force away from the drum surfaces when the motor II is driving the load L at high speeds.

The output shaft 16 of motor II will of course transmit torque directly to the wheel 14 of the clutch unit and since its only direction of operation when the motor II is energized is as indicated at f' and f'' FIG. 1, no clutching operation is needed for such operation of the load L.

In order to enable the reverse or clockwise low speed operation of the load through the clutch C a normally disengaged spring clutch assembly including the drum members 28 and 29 comprises in part a second (e.g., left hand wound) doubly full floating clutch spring 35 occupying an annular space 36 between internal clutch drum surfaces 38 and 39 of clutch drum members 28 and 29 and stationary sleeve 20. Clutch spring 35 normally has three principal diameters comprising a group of coils 40 preloaded outwardly against the internal drum surface 38 for self energization thereon, a central or intermediate group of coils 40' normally in radially spaced relationship to the internal drum surfaces 38 and 39, and a further group of energizing coils 40'' which are preloaded against an external drum surface 41 of the stationary sleeve 20.

When the wheel 10 is being turned counterclockwise by motor I in the forward direction, then due to the direction of winding of the spring 35 and the preloading of coils 40'' on the stationary sleeve 20 the coils 40 of clutch spring 35 overrun on the input drum surface 38.

When the motor I is reversed so that the wheel 10 turns clockwise the drum surface 28' of drum member 28 overruns in the leftward coils of spring 30 and, due to the overrunning drag of coils 40'' of clutch spring 35 on the stationary sleeve 20, the coils 40' are expanded so as to be in gripping or driving contact with the input and output drum associated surfaces 38 and 39. No overrunning action or operation is required in respect to the forward driving clutch spring 30 during slow-load-speed operation in reverse since the drum members 28, 29 are being turned at the same speed by clutch spring 35.

When the necessary cycles of forward and reverse low-speed driving of the load have been completed the final low speed operation should be accomplished counterclockwise as during draining of the tub or cylinder L, i.e., before high speed operation is commenced. Thereby at the end of the low speed operations the coils 40' will have been returned to their illustrated position FIG. 2 due to overrunning of the coils 40 on the input drum surface 38. Release of the coils of spring 35 from the drum members 28 and 29 would occur automatically as soon as the counterclockwise high-load-speed operation is commenced.

At commencement of high speed drive of the load (e.g. drying operation) motor I is deenergized; motor II is energized in the indicated counterclockwise direction f' first at slow and then at fast speed and during each operation the outer spring 30 overruns on drum surface 28' initially at least and the coils 40 of spring 35 overrun on the interior of drum 28 as already mentioned until the wheel 10 stops turning. Thereafter due to proper selection of index and preloading on part of left hand end coils of spring 30, those coils are expanded centrifugally at both the low and high speed operations of motor II, wherefore there is no overrunning drag whatsoever on the output of motor II or its connected load. During the high speed operations the coils of clutch spring 30 are prevented from becoming damaged by the coil-expansion-limiting function of freeturning sleeve 32.

We claim:

1. A coil clutch adapted selectively to connect two motors one of which is reversible to a common load, comprising two axially aligned rotatable clutch drum members each having an internal and an external drum surface thereby forming two cooperating pairs of clutch drum surfaces, two helical clutch springs respectively bridging said pairs, one of the clutch springs being preloaded on each of its cooperating drum surfaces in full floating relationship thereto, the other having coils preloaded on and in full floating relationship to one cooperating drum surface only and having adjacent coils normally spaced radially from at least the other cooperating drum surface, said other clutch spring having energizing end coils remotely of the preloaded coils, and a non-rotatable energizing drum member for said other clutch spring and on which said end coils are preloaded and full floating.

2. A coil clutch adapted to connect two motors one of which is reversible to a common load, axially aligned relatively rotatable and axially adjacent input and output drum members each having an internal and an external clutch drum surface, a first helical clutch spring preloaded on the external drum surfaces and in full floating relationship thereto, a second helical clutch spring having end coils preloaded and full floating on the internal input drum surface and other coils normally radially spaced from the internal output drum surface but disposed for gripping that drum surface, and a non-rotary drum member on which end coils of the second clutch spring remotely of the first mentioned end coils are preloaded and full floating for energizing the radially spaced coils into gripping contact with the associated drum surface of the output member.

3. The clutch according to claim 2 wherein the first clutch spring is more heavily preloaded on the external surface of the output drum member than on the external drum surface of the input drum member.

4. The clutch according to claim 2 wherin the radially spaced coils of the second clutch spring are smaller in diameter than the first mentioned end coils thereof and larger in diameter than the second mentioned end coils.

5. In a mechanism of the class described, a rotary load, a first motor means capable of exerting torque in opposite directions, a second motor means capable of exerting torque in a single direction, a coil clutch having an input clutch drum member connected to be driven reversibly by the output torque of the first motor means and an output clutch drum member axially aligned with the input drum member, the drum members having coacting pairs of internal and external clutch drum surfaces, means connecting the input drum member to receive torque from the first motor means, means connecting the output drum member to receive torque from the second motor means and to deliver torque to the load, a first helical clutch spring in full floating self-energizing relationship to the pair of external drum surfaces, a second helical clutch spring wound in the same direction as the first spring and having end coils in self energizing full floating relationship to the internal drum surface of the input drum member, having other coils normally in radially spaced relationship to the internal drum surface of the output drum but capable of gripping contact therewith, and, further, having energizing end coils; and a stationary drum member inside the second spring and on which the energizing end coils thereof are preloaded and full floating.

No references cited.